United States Patent [19]

Sanders et al.

[11] Patent Number: 4,791,268
[45] Date of Patent: Dec. 13, 1988

[54] ARC PLASMA TORCH AND METHOD USING CONTACT STARTING

[75] Inventors: Nicholas A. Sanders, Norwich, Vt.; Richard W. Couch, Jr., Hanover, N.H.

[73] Assignee: Hypertherm, Inc., Hanover, N.H.

[21] Appl. No.: 9,508

[22] Filed: Jan. 30, 1987

[51] Int. Cl.⁴ .............................................. B23K 9/00
[52] U.S. Cl. .................... 219/121.57; 219/75; 219/121.52; 219/121.51; 219/121.48; 219/121.59
[58] Field of Search .............. 219/121 PR, 121 PM, 219/121 PQ, 121 PP, 74, 75, 76.16, 121 P, 121 PT, 121 PU, 121 PV; 313/231.31, 231.41, 231.51

[56] References Cited

U.S. PATENT DOCUMENTS

| | | | |
|---|---|---|---|
| 2,784,294 | 3/1957 | Gravert | 219/75 |
| 2,898,441 | 8/1959 | Reed et al. | 219/75 |
| 2,923,809 | 2/1960 | Clews et al. | 219/75 |
| 3,004,189 | 10/1961 | Giannini | 219/75 |
| 3,082,314 | 3/1963 | Arata et al. | 219/75 |
| 3,131,288 | 4/1964 | Browning | 219/121 P |
| 3,242,305 | 3/1966 | Kane et al. | 219/121 PM |
| 3,534,388 | 10/1970 | Ito et al. | 219/121 PM |
| 3,619,549 | 11/1971 | Hogan et al. | 219/121 P |
| 3,641,308 | 2/1972 | Couch, Jr. et al. | 219/75 |
| 3,787,247 | 1/1974 | Couch, Jr. | 148/9 |
| 3,833,787 | 9/1974 | Couch, Jr. | 219/75 |
| 4,203,022 | 5/1980 | Couch, Jr. et al. | 219/121 P |
| 4,463,245 | 7/1984 | McNeil | 219/121 PM |
| 4,567,346 | 1/1986 | Marhic | 219/121 PR |

FOREIGN PATENT DOCUMENTS 0159256 10/1985 European Pat. Off. .
0157702 10/1985 European Pat. Off. .

OTHER PUBLICATIONS

Silvano Dallavalle et al., Torcia Di Saldatura O Taglio Al Plasma Con Arco Non Trasferito, Feb., 1986.

Primary Examiner—M. H. Paschall
Attorney, Agent, or Firm—Wolf, Greenfield & Sacks

[57] ABSTRACT

An arc plasma torch includes a moveable cathode and a fixed anode which are automatically separated by the buildup of gas pressure within the torch after a current flow is established between the cathode and the anode. The gas pressure draws a nontransferred pilot arc to produce a plasma jet. The torch is thus contact started, not through contact with an external workpiece, but through internal contact of the cathode and anode. Once the pilot arc is drawn, the torch may be used in the nontransferred mode, or the arc may be easily transferred to a workpiece. In a preferred embodiment, the cathode has a piston part which slidingly moves within a cylinder when sufficient gas pressure is supplied. In another embodiment, the torch is a hand-held unit and permits control of current and gas flow with a single control.

23 Claims, 2 Drawing Sheets

ARC PLASMA TORCH AND METHOD USING CONTACT STARTING

BACKGROUND OF THE INVENTION

The present invention relates to arc plasma torches, and more particularly to a method and a mechanical/pneumatic arrangement for contact starting an arc in such torches.

There are three currently known methods to initiate a plasma arc discharge and start an arc plasma torch: high frequency or high voltage discharge, contact starting, and with an exploding wire technique. In each method, an arc is drawn between a cathode and an anode, and an ionizable gas is directed to flow around the arc, creating a plasma jet.

The oldest, and still most widely used method in the prior art is the high frequency discharge or high voltage spark discharge method. In either case, a high voltage breaks down the gap between a cathode and an anode, generating charge carriers which create the electric current path necessary to start the arc. An example of this method is disclosed in U.S. Pat. No. 3,641,308 to Couch Jr. et al. In that patent, a brief high voltage pulse is provided to the cathode which initiates an arc discharge across the gap from the cathode to a grounded workpiece.

Until recently, the high frequency method of arc starting was used exclusively for plasma torches. However, such an arc starting circuit produces significant amounts of electromagnetic interference in nearby electronic equipment, requiring either extensive shielding or remotely locating the electronics. Furthermore, the equipment required to generate the high frequency discharge tends to be quite expensive and has had a negative impact on the economic competitiveness of plasma cutting torches when compared with other cutting methods.

The second known starting method is contact starting. Although initially developed by Creare Inc. for the Air Force in the early 1960's, this method is just beginning to gain in popularity. Contact starting uses low electric currents, and eliminates the need for high frequency equipment along with the associated high cost and electromagnetic interference. The present invention relates to a novel variation in contact starting, as more fully discussed below, and shares in the known benefits of contact starting.

In all known torches which use contact starting, the cathode is manually placed into electrical connection with the workpiece, a current is passed from the cathode to the workpiece, and the arc is struck by manually backing the cathode away from the workpiece. In several prior art systems, the cathode is the electrode, and the nozzle through which the plasma jet passes serves as an electrical conductor connecting the electrode with the workpiece. In these systems, the nozzle is slidable with respect to the electrode, and is forced into contact with the electrode when it is pressed against the workpiece. Thus, the electrode, nozzle, and workpiece are all in electrical series connection when the current flow is initiated. When the electrode is manually backed away from the workpiece, the nozzle is allowed to separate from the electrode and return to its normal position.

These contact starting systems are disadvantageous since the nozzle is pressed against the workpiece. Since there is usually a brittle ceramic element at the end of the nozzle, such pressing risks damage to the nozzle. Also, it is difficult in practice to initiate a cut while at the same time attempting to press the nozzle down onto a workpiece. Another significant problem with this starting method is that nonconductive coatings such as paint makes electrical contact starting using the workpiece very difficult. As a result, most manufacturers today use a pilot arc circuit even when they have contact starting in order to cut through the paint layer.

The third known method of arc plasma torch starting is known as the "exploding wire" technique. An electrical conductor is extended from the cathode to the workpiece. The conductor vaporizes when the current is initiated, leaving the arc in its place. An obvious drawback to the exploding wire technique is, of course, that it is not practical for use in restartable plasma torches.

It is therefore a principal object of the present invention to provide an arc plasma torch that can be started without high frequency discharge or high voltage spark discharge.

Another principal object of the present invention is to start arc plasma torches without electro-magnetic interference in nearby electronics.

It is still another object to provide a torch which can be started away from the workpiece.

A further object is to provide a torch which may be easily restarted after shutdown.

It is still a further object to provide a torch which automatically draws an arc.

Yet a further object is to provide the torch which can be constructed relatively simply and economically, can be operated without expensive external electronics, and can be readily and easily repaired.

SUMMARY OF THE INVENTION

The present invention relates to an arc plasma torch and method for contact starting the torch in which a moveable cathode automatically separates from an anode in response to the buildup of gas pressure within the torch. Current flowing from the cathode to the anode before the separation creates a pilot arc across the gap as the cathode and anode separate.

In a preferred embodiment, the invention includes a moveable electrode which acts as the cathode and a fixed nozzle which acts as the anode. The electrode is urged into contact with the nozzle by a spring when no gas is flowing within the torch. When the electrode is thus urged against the nozzle, it blocks the nozzle orifice. The nozzle includes a piston part which slidingly moves within a cylinder formed near the bottom of the torch.

After electrical current is flowing from the electrode to the nozzle, gas is supplied to the torch, filling a plenum within the cylinder and below the piston part. The gas exerts a force upon the piston part counteracting the force exerted by the spring. When the gas pressure becomes high enough, the electrode is driven upward within the cylinder and away from the nozzle, breaking the electrical contact between the electrode and the nozzle creating the pilot arc. As the electrode moves away from the nozzle, it opens the nozzle orifice, and permits a plasma jet to eminate from the torch.

When the pilot arc is drawn across the gap between the nozzle and electrode, and the plasma jet is emitted from the nozzle, the torch is operating in the nontransferred pilot arc mode. It may continue to be used in this manner, shut down for later restarting by turning off the supply of current and gas, or the arc may be transferred to a workpiece.

In an alternate embodiment, the present invention is a hand-held torch in which the electrical current flow followed by the gas flow are both automatically initiated, in the proper sequence, by depressing a single start button. In this hand-held embodiment, the start button urges a plunger into electrical contact with a check ball to close a starting circuit. The power supply detects this closure of the starting circuit and causes electrical current to flow from the electrode (cathode) into the nozzle (anode). By depressing the start button further, the check ball is driven away from its seat permitting gas to flow within the torch and into the plenum beneath the piston part, exerting a pressure against the spring and moving the electrode away from contact with the nozzle, drawing an arc and producing a plamsa jet.

These and other features and objects of the present invention will be described in the following detailed description of the invention which should be read in light of the accompanying drawings.

DETAILED DESCRIPTION OF THE PREFERRED EMBODIMENTS

Figure 1:
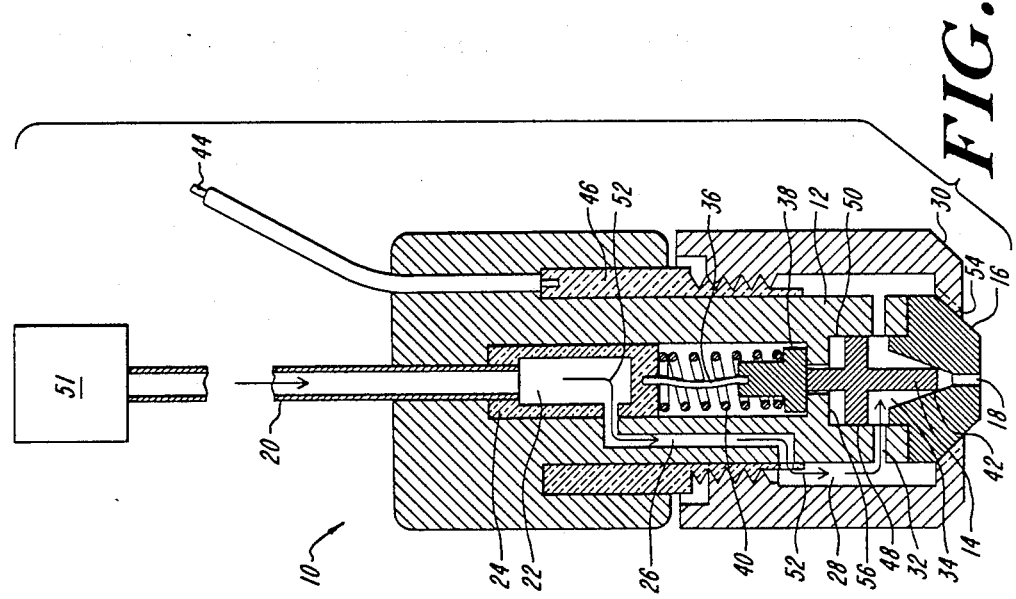
FIG. 1 is a view in vertical section of a preferred embodiment of an arc plasma torch using a contact starting system constructed in accordance with the present invention.

Referring to FIG. 1, there is a plasma torch 10 having a generally cylindrical body 12, an electrode 14, and a nozzle 16 having a central orifice 18. A main current and gas tube 20, located at the top of the body 12, leads to an upper plenum 22 within connector block 24, then to a passage 26 within the body 12, next to an annular space 28 between the body 12 and a cap 30 attached to the body. The cap 30 is threaded onto the body 12 to facilitate replacement of internal parts. Gas inlet swirl holes 32 lead from the annular space 28 to a plasma chamber 34 between the body 12 and the nozzle 16. The swirl holes 32 are tangential to the chamber 34 so that gas flowing into the chamber will swirl around the electrode 14. A flow of an ionizable gas such as nitrogen is directed around and adjacent to the electrode 14 so that an arc plasma column is formed which is directed through the nozzle 16.

One end of a plunger wire 36 is attached to the connector block 24 and the other end to a plunger 38. The plunger 38 is urged into abutting contact with the electrode 14 by an electrode spring 40. As shown, the electrode spring 40 is in its fully extended position, and thus the plunger 38 forces the electrode 14 against a contact area 42 of the nozzle 16, blocking the nozzle orifice 18. A pilot arc return lead 44 passes within the body 12, connecting to a cap current ring 46.

Electrode 14 has a circumferential flange forming a piston part 48 fabricated to slidingly fit within a cylinder 50 formed in the bottom of the torch body 12.

The body 12 is fabricated from an electrically insulating material such as the high temperature plastic sold by I.E. DuPont de Nemours Co. under the trademark Vespel. The electrode spring 40 is preferably fabricated from a metallic material such as stainless steel or beryllium copper. All of the other foregoing components of the torch 10 are fabricated from electrically conducting structural materials.

Generally stated, to start the arc plasma torch of the present invention there must be an electrical current flow followed by ionizable gas flow. After a power supply (not shown), which is connected to the remote end of the main current and gas tube 20, is turned on, current flows through the tube 20, the connector block 24, the plunger wire 36, the plunger 38, and into the electrode 14. As shown, the electrode 14 is forced against the contact area 42 of the nozzle 16. This is the normal position for the electrode during the current flow step of starting the torch 10. Thus, current will flow from the electrode 14 through the nozzle 16, into the cap 30, current ring 46, and pilot arc return lead 44. The pilot arc return lead 44 is also connected to the remote power supply. As the current is simply flowing through the torch 10, and not across an arc, this is known as the "dead short" mode of operation.

After current is flowing in the dead short mode, a remote gas valve (not shown), connecting the main current and gas tube 20 to a pressurized external supply of a gas 51, is opened and gas is allowed to flow into the torch through the tube 20. The gas flow generally follows arrows 52, filling the upper plenum 22, flowing through the passage 26, the annular space 28, the swirl holes 32, and filling the plasma chamber 34. In an alternate embodiment, some of the gas flow may be bypassed through cooling holes 54, shown in phantom in FIG. 1, to cool the external surface of the nozzle 16.

As the gas flows into the torch 10, the gas pressure within the plasma chamber 34 increases, exerting a force on the underside of the piston part 48 of the electrode 14 which opposes the force exerted upon the electrode by the electrode spring 40. When the gas pressure becomes high enough, the force on the piston part 48 counteracts and overcomes the force of the spring 40 and the electrode 14 is driven upward within the cylinder 50, opening the orifice 18, breaking electrical contact at area 42 and coming to rest against a bottom end 56 of the cylinder. As a result of the break in electrical contact between the electrode 14 and nozzle 16, an electric arc is generated between the electrode (which serves as the cathode) and the nozzle (which serves as the anode). The arc between the electrode 14 and nozzle 16 is known as the pilot arc. The gas flowing around the pilot arc and through the nozzle orifice 18 forms a plasma jet.

When the arc is formed within the torch and the plasma jet is emitted from the nozzle orifice 18, the torch is operating in what is known as the nontransferred "pilot arc mode". The torch may be used in this mode, transferred to operate upon a workpiece, or may be shut down for later restarting. To shut the torch down, the electrical current flow from the power supply is interrupted, shutting down the pilot arc between the electrode 14 and nozzle 18. Next, the remote gas valve is closed, stopping gas flow into the torch, and reducing the gauge pressure within the plasma chamber 34 to zero. Without the counteracting gas pressure, the electrode spring 40 urges the electrode 14 back into its normally closed position, resting against the contact area 42.

Of course, under normal circumstances, rather than shutting the torch down, it is usually operated in the "transferred mode". The torch, operating in the pilot arc mode, is brought near a workpiece (not shown) held at the same electrical potential as the nozzle. The plasma gas leaving the nozzle orifice 18 ionizes the gap between the nozzle 16 and the workpiece creating a current path, and the arc transfers, extending from the electrode 14 to the workpiece. After the arc is transferred to the workpiece, the current flow in the pilot arc return lead 44 may be interrupted by a switch or relay (not shown), stopping all current flow in the pilot arc circuit.

Figure 2:
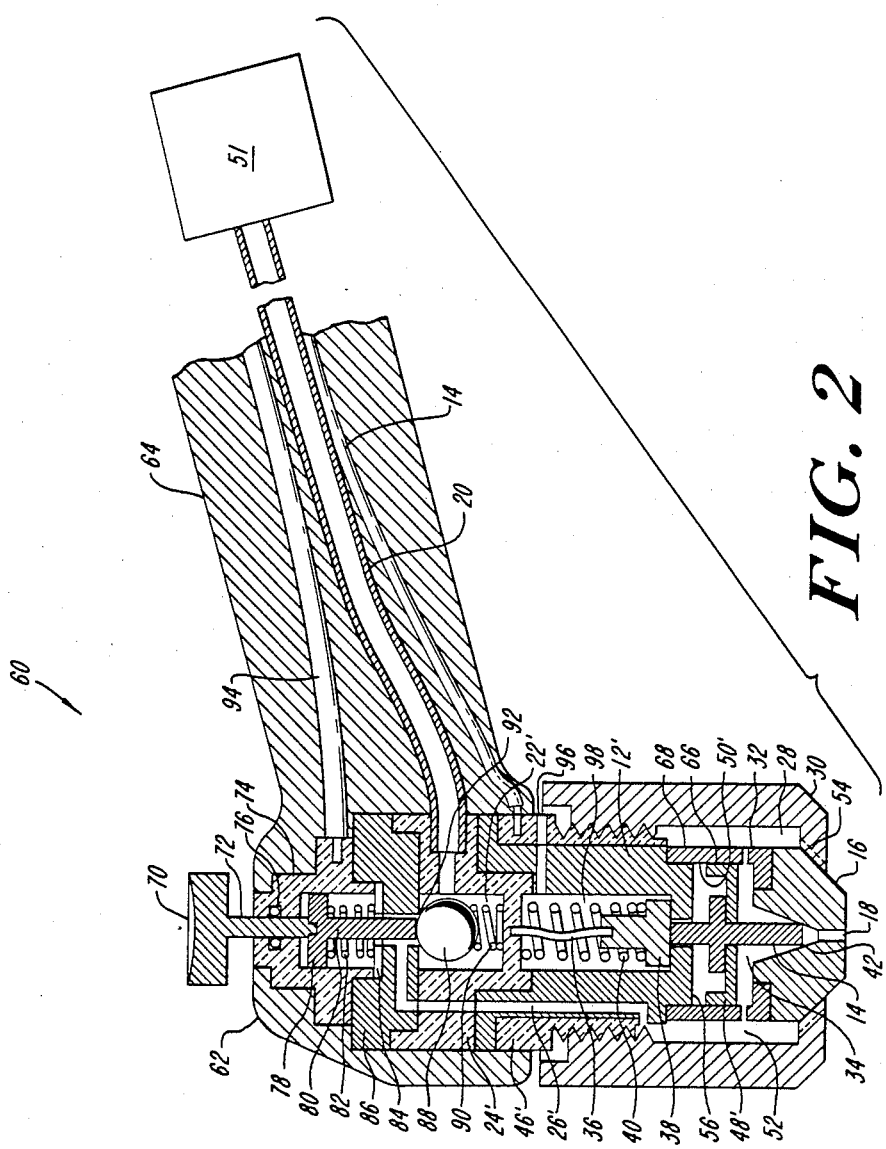
FIG. 2 is a view in vertical section of a preferred embodiment of a hand-held arc plasma torch using a contact starting system constructed in accordance with the present invention.

Referring now to FIG. 2, a hand-held plasma torch 60 operates in a manner similar to that of torch 10. Corresponding components in the torches 60 and 10 are identified herein with the same reference numerals, but with primes added for components of the torch 60 which have a different configuration from those in the torch 10. A generally cylindrical torch body 12' is located by a gap current ring 46' below a torch head 62. The torch body 12' corresponds to the lower portion of the body 12 in torch 10, while the torch head 62 together with a torch handle 64 correspond generally to the upper portion of the body 12. As in torch 10, the hand-held torch 60 includes the moveable electrode 14, having a piston part 48' which slidingly fits within a cylinder 50'.

In contrast to the previously described piston part 48 of torch 10, the piston part 48' is separate from the electrode 14 and may be fabricated from an insulating material. Furthermore, piston part 48' includes a piston skirt 66 which provides a relatively large piston to cylinder-wall contact area, guiding the electrode 14 and preventing it from becoming skewed within the cylinder 50'. Additionally, the cylinder 50' is formed within a swirl ring 68 rather than at the lower end of the body 12 of the torch 10. The swirl ring 68 includes the gas swirl holes 32, leading tangentially from the annular space 28 into the plasma chamber 34. The swirl ring 68 may also be fabricated from an insulating material.

A major distinguishing feature of the hand-held torch 60 when compared to the torch 10 is that both electrical current flow and ionizable gas flow are initiated, in the proper sequence, by depressing a single start button 70.

The start button 70 includes a button stem 72 which passes through a contact plunger body 74 and an O-ring 76, and finally engages a contact plunger 78. The contact plunger 78 has a plunger stem 80 which passes through a plunger return spring 82, a washer 84, and an insulator 86. The hole in the insulator 86 through which the plunger stem 80 passes has a diameter which is somewhat larger than the diameter of the plunger stem 80, so that there is an annular space between the plunger stem 80 and the insulator 86.

A plenum 22' is formed within a connector block 24' and is located immediately below the insulator 86. Within the plenum 22' is a gas inlet check ball 88 and a ball return spring 90. The ball return spring 90 urges the check ball 88 upward within the plenum 22 to rest against a seat area 92, blocking the hole at the bottom of the insulator 86.

The torch 60 is started by depressing the start button 70. This causes the button stem 72 to exert a downward force on the contact plunger 78, acting against the force of the return spring 82. The contact plunger 78, is at all times in electrical connection with a start button wire 94, through a circuit including the contact plunger body 74, the washer 84, and the return spring 82. In a similar manner, the gas inlet check ball 88 is at all times in electrical connection with the main current and gas tube 20, through a circuit including the connector block 24' and the ball return spring 90. The start button wire 94 connects the contact plunger body 74 to a remote starting current source (not shown).

When the start button 70 is depressed sufficiently so that the plunger stem 80 contacts the check ball 88, a circuit from the start button wire 94 to the main current and gas tube 20 is closed. This is the position shown in FIG. 2. The closing of this plunger to check ball starting circuit is sensed in the remote power supply (not shown), turning on the power supply and causing current on the order of 5 to 50 Amps to flow through the tube 20, the connector block 24', the plunger wire 36, the plunger 38, and into the electrode 14. As shown, at this point during the starting procedure, the electrode 14 is forced against the contact area 42 of the nozzle 16. Thus, current flows in the dead short mode of operation from the electrode 14 through the nozzle 16, into the cap 30, current ring 46', and pilot arc return lead 44.

By continuing to depress the start button 70 further, the check ball 88 is displaced downward from its normally seated position against seat area 92. This allows gas, under pressure from a remote gas source 51, connected to the main current and gas tube 20, to flow from the plenum 22' past the check ball 88, into the annular gap between the plunger stem 80 and the insulator 86, and through a passage 26' in the insulator 86, the connector block 24', and the body 12'. The gas generally follows arrows 52, flowing into the annular space 28, through the swirl holes 32, and fills the plasma chamber 34. In an alternate embodiment, some of the gas flow may be bypassed to cool the nozzle 16 through cooling holes 54, shown in phantom in FIG. 2.

In a manner similar to the operation of the torch 10, gas pressure exerts a force on the underside of the piston part 48', overcoming the force exerted by the electrode spring 40 and driving the electrode 14 upward within the cylinder 50', opening the orifice 18, and breaking electrical contact at area 42. To insure rapid movement of the electrode 14, a trapped gas bleed hole 96 allows any gas which flows past the plunger 38 and into a spring plenum 98 to bleed out of the plenum 98, preventing the gas from resisting the force exerted on the underside of piston part 48'. Thus, a pilot arc is generated between the electrode 14, serving as the cathode, and the nozzle 16, which serves as the anode. Gas flowing around the arc and through the nozzle orifice 18 forms a plasma jet, and the hand-held torch 60 may be operated in this nontransferred pilot arc mode.

The torch 60 may be converted to the transferred mode by bringing the torch, while operating in the pilot arc mode, near a workpiece held at anode potential, transferring the arc from the nozzle 16 to the workpiece. Once the arc is transferred, the pilot arc lead 44 could be interrupted, stopping current flow in the pilot arc circuit. The hand-held torch 60 will operate in either the pilot arc or transferred mode only as long as the start button 70 remains depressed.

When the start button 70 is released, the contact plunger 78 moves upward, allowing the check ball 88 to come into contact with and seal the seat area 92 stopping the gas flow and shutting down the plasma jet. As the plunger 78 continues to move upwardly, electrical contact between the plunger 78 and the check ball 88 is broken, and the open circuit is sensed by the remote power supply, stopping all current flow and shutting down the arc. The pressure in the plasma chamber 34 simultaneously decreases, and the electrode 14 returns to its seated and normally closed position.

Figure 3:
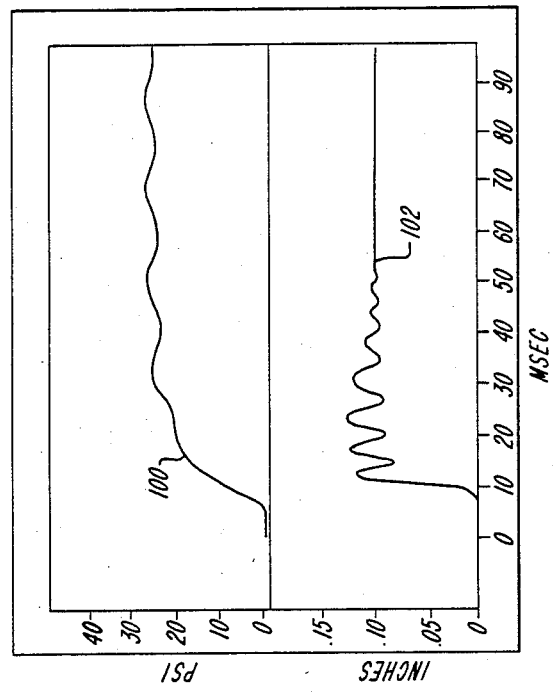
FIG. 3 is a graph depicting time-dependent variations in gas pressure and electrode displacement of an arc plasma torch started in accordance with the present invention.

The ability of the electrode to be rapidly driven by the gas flow into its operating position after contact starting of the torch has been tested in the laboratory. FIG. 3 is a graph produced from an oscilloscope display of the results. Two traces are presented. An upper trace 100 is from the output of a pressure transducer and represents the pressure within the plasma chamber 34 as a function of time. A lower trace 102 is from the output of a motion or displacement transducer and represents the displacement of the electrode 14, also as a function of time. As can be clearly seen, the electrode 14 settles into its operating position in about 10 msec, well before the pressure in the plasma chamber has settled into its steady state value. The results of this experiment are typical for arc plasma torches, however the time required for the electrode to settle into its operating position will, of course, vary with factors such as the size of the piston part 48, 48', the force exerted by the electrode spring 40, and the steady state gas pressure supplied to the plasma chamber 34.

In the arc plasma torch contact starting system used to generate the data shown in FIG. 3, the piston part 48 had a diameter of approximately 0.300 inch, and the electrode 14 travelled upward approximately 0.1 inch within the plasma chamber 34. The electrode spring 40 exerted a force of approximately 5 lbs. The gas was supplied with a pressure of approximately 20 psi, and the nozzle orifice 18 had a diameter of only approximately 0.022 inch, insuring that the pressure in the chamber 34 remained high enough to keep the electrode 14 fixed against the end 56.

It is thus seen that the objects of this invention have been achieved and other advantageous results attained in that there has been disclosed a torch and method for starting the torch which does not require high frequency or high voltage discharges, which does not produce electro-magnetic interference, which does not require contact with a workpiece, which may be easily restarted, which automatically draws an arc, and which is simple and economical to construct, operate and repair.

While FIGS. 1 and 2 show arc plasma torches and components having substantially cylindrical shapes, it is to be understood that such structure is not intended as any limitation, as the present invention might be embodied in torches or components of different shapes.

Various modifications of the present invention will become apparent to those skilled in the art from the foregoing description and accompanying drawings. For example, a leaf-spring could replace the helical electrode spring or more generally the mechanical spring could be replaced by a fluid-type spring. Additionally, while the invention has been described as having an electrode which moves in response to pressure build up within a cylinder below a piston part, it would also be possible to have internal gas jets directed at vanes to move the electrode. Also, while the invention has been described with respect to a moveable cathode and a fixed anode, the cathode can be fixed while the gas pressure moves the anode structure, e.g. a nozzle extension piece. Further, it is possible, although perhaps more difficult to execute and control, to have both the cathode and the anode movably mounted with respect to one another in response to the applied gas pressure. Such modifications are intended to fall within the scope of the appended claims.

What is claimed is:

1. A method for starting to operate an arc plasma torch having a body with a plasma exit port at one end and an anode and a cathode that are movable relative to one another within the torch body along a first direction, comprising:
   resiliently urging the cathode into electrical contact with the anode,
   providing a surface transverse to said first direction that is operatively coupled with movable one of said cathode and anode,
   blocking said exit port with said cathode when said cathode is in contact with said anode
   providing a gas chamber within said torch body between said transverse surface and said cathode and said anode that is sealed by said blocking,
   causing an electrical current to flow within the torch and from said cathode to said anode,
   supplying a pressurized gas to the interior of the torch at said chamber, and
   directing at least some of said gas in said chamber to act on said transverse surface to separate said anode from said cathode forcibly and against the force of said resilient urging whereby an electric arc is generated between said anode and said cathode and whereby said exit port is opened.

2. The method of claim 1 wherein said gas is an ionizable gas, and further comprising directing at least some of said gas to flow around said arc and out of the torch when said anode and said cathode separate, forming a plasma jet.

3. The method of claim 2 wherein said anode is a nozzle having an orifice, and further comprising directing said plasma jet to flow out of said orifice when said nozzle and said cathode separate.

4. The method of claim 3 further comprising substantially preventing said gas from flowing out of said orifice when said nozzle and said cathode are in contact.

5. The method of claim 3, further comprising:
   providing a workpiece,
   causing said workpiece to have an electrical potential substantially equal to the electrical potential of said nozzle, and
   bringing the torch near said workpiece so that said plasma jet ionizes the gap between said nozzle and said workpiece creating a current path from said nozzle to said workpiece and transferring said arc to extend from said cathode to said workpiece.

6. The method of claim 3 further comprising directing at least some of said gas to flow out of cooling holes spaced from said nozzle orifice and along the external surface of said nozzle.

7. The method of claim 1 further comprising operating a single control to initiate the flow of said current and the flow of said gas, whereby the flow of said gas follows the flow of said current.

8. An automatic arc plasma torch contact starting system, comprising:
   a torch body having a plasma exit port at one end,
   an anode supported on said body,
   a cathode supported within said body,
   said anode and cathode being mounted for a mutual linear reciprocating movement along a first direction, means mounted within said body for resiliently urging said cathode along said first direction into electrical contact with said anode and thereby closing said exit port, means for causing an electrical current to flow between said cathode and said anode, means for directing a gas to flow within the torch to separate said anode from said cathode forcibly, said directing means including a chamber located within said body between said cathode and said anode that is closed to the exterior of said torch by said cathode closing said exit port when said cathode and said anode are placed into contact, whereby an electrical arc is generated between said cathode and said anode and whereby said exit port is opened.

9. The system of claim 8 wherein said cathode is an electrode and said anode is a nozzle.

10. The system of claim 9 wherein said electrical contact urging means includes coil a spring.

11. The system of claim 9 further comprising a piston part formed integrally with said cathode and wherein said chamber slidingly receives said piston part, whereby gas accumulating within said chamber exerts a force against said surface of said piston part opposite to the force exerted by said electrical contact urging means causing said cathode to separate from said nozzle.

12. The system of claim 11 wherein said chamber is on the opposite side of said piston part from said electrical contact urging means.

13. The system of claim 8 wherein said gas directing means directs at least some of said gas to flow around said arc.

14. The system of claim 13 wherein said anode is a nozzle having an orifice and said gas flowing around said arc and out of said orifice forms a plasma jet.

15. The system of claim 14 wherein said gas directing means substantially prevents said gas from flowing out of said nozzle orifice when said nozzle and said cathode are in contact.

16. The system of claim 15 further comprising cooling holes spaced from said nozzle orifice, and means for directing at least some of said gas to flow out of said cooling holes and along the external surface of said nozzle.

17. The system of claim 13 wherein said gas directing means directs said gas to swirl around said arc.

18. The system of claim 8 further comprising means for initiating said current flow followed by said gas flow.

19. The system of claim 18 wherein said initiating means includes a start button.

20. The system of claim 19 wherein said initiating means includes a starting circuit which is closed when said start button is depressed.

21. The system of claim 20 further comprising means for sensing when said starting circuit is closed, whereby said electrical current flowing means cooperates with said sensing means to start flowing current from said cathode to said anode when said starting circuit is closed.

22. The system of claim 20 wherein said initiating means includes means for opening a gas flow passage when said start button is depressed beyond the point where said starting circuit is closed, whereby said passage opening means cooperates with said gas flow directing means to start directing said gas to flow when said gas flow passage is opened.

23. The system of claim 22 wherein said passage opening means includes:

a plenum having an opening, a check ball within said plenum sized to block said opening, and means for urging said check ball to block said plenum opening, whereby said check ball is displaced from blocking said opening when said start button is depressed beyond the point where said starting circuit is closed.

* * * * *